(12) United States Patent
Roche

(10) Patent No.: US 8,162,254 B2
(45) Date of Patent: Apr. 24, 2012

(54) AIRCRAFT ENGINE ASSEMBLY COMPRISING A JUNCTION AERODYNAMIC FAIRING MOUNTED ON TWO SEPARATE ELEMENTS

(75) Inventor: Frederic Roche, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 611 days.

(21) Appl. No.: 12/307,142

(22) PCT Filed: Jul. 10, 2007

(86) PCT No.: PCT/EP2007/057022

§ 371 (c)(1),
(2), (4) Date: Dec. 31, 2008

(87) PCT Pub. No.: WO2008/006826

PCT Pub. Date: Jan. 17, 2008

(65) Prior Publication Data

US 2009/0283631 A1    Nov. 19, 2009

(30) Foreign Application Priority Data

Jul. 11, 2006    (FR) ..................................... 06 52912

(51) Int. Cl.
*B64D 27/00*    (2006.01)
(52) U.S. Cl. ........................................................ 244/54
(58) Field of Classification Search ................ 244/53 B, 244/54; 60/226.1
See application file for complete search history.

(56) References Cited

U.S. PATENT DOCUMENTS

| 4,132,069 | A | * | 1/1979 | Adamson et al. ................ 244/54 |
| 4,147,029 | A | * | 4/1979 | Sargisson ......................... 244/54 |
| 4,603,821 | A | * | 8/1986 | White .............................. 244/54 |
| 4,825,648 | A | * | 5/1989 | Adamson ..................... 60/226.1 |
| 5,524,847 | A | * | 6/1996 | Brodell et al. .................. 244/54 |
| 5,755,403 | A | | 5/1998 | Marche |
| 5,864,922 | A | * | 2/1999 | Kraft ............................... 16/266 |
| 6,334,588 | B1 | | 1/2002 | Porte |
| 2004/0255572 | A1 | | 12/2004 | Porte |

FOREIGN PATENT DOCUMENTS

| EP | 0 744 339 | 11/1996 |
| EP | 1 488 999 | 12/2004 |
| WO | 99 30969 | 6/1999 |

OTHER PUBLICATIONS

U.S. Appl. No. 12/307,136, filed Dec. 31, 2008, Roche, et al.

* cited by examiner

*Primary Examiner* — Galen Barefoot
(74) *Attorney, Agent, or Firm* — Oblon, Spivak, McClelland, Maier & Neustadt, L.L.P.

(57) ABSTRACT

An aircraft engine assembly including an engine, an engine mounting structure, and a nacelle surrounding the engine and including an air intake and fan cowls. The assembly further includes a cradle supporting the fan cowls, fixedly mounted on the mounting structure or else on an entity including a fan case and the air intake attached to the case. The engine assembly further includes a junction aerodynamic fairing including a first mounting mechanism mounted on the cradle, and including a second mounting mechanism mounted on the other of the elements from among the mounting structure and the entity.

10 Claims, 7 Drawing Sheets

AIRCRAFT ENGINE ASSEMBLY COMPRISING A JUNCTION AERODYNAMIC FAIRING MOUNTED ON TWO SEPARATE ELEMENTS

TECHNICAL AREA

The present invention generally relates to an aircraft engine assembly comprising an engine, an engine mount and a nacelle surrounding the engine the nacelle having an air intake and fan cowls, the above-mentioned engine mount possibly including a forward aerodynamic structure on which the fan cowls are movably mounted.

This type of engine mount also called a mounting pylon or <<EMS>> for Engine Mounting Structure, globally allows an engine such as a turbojet engine to be attached below an aircraft wing, or to be mounted above this same wing, or even allows this same engine to be attached to an aft portion of the fuselage of the aircraft.

STATE OF THE PRIOR ART

Said mounting structure is effectively designed to form a connecting interface between an engine and an aircraft wing. It allows the loads generated by its associated engine to be transmitted to the airframe, and also provides a pathway for fuel and electric, hydraulic and air supply lines between the engine and the aircraft.

To ensure the transmission of loads, the mounting structure comprises a rigid structure, also called primary structure, often of <<box>> type i.e. formed by the assembly of upper and lower spars and of side panels joined together via transverse ribs.

Also, the mounting structure is provided with mounting means positioned between the engine and the rigid structure, these means globally comprising two engine attachments and a thrust load device to transmit the thrust loads generated by the engine. In the prior art, this thrust load device usually comprises two side thrust links joined firstly to an engine casing such as the fan case or the intermediate casing, and secondly to an aft engine attachment attached to the central casing or its exhaust case.

Similarly, the mounting structure also comprises another series of attachments forming a mounting system positioned between the rigid structure and the aircraft wing, this system usually consisting of two or three attachments.

Additionally, the pylon is provided with a plurality of secondary structures which, in particular, ensure the separating and supporting of supply lines whilst carrying aerodynamic cowling, these structures generally being in the form of panels or cowls integrated in these same structures. In manner known to persons skilled in the art, the secondary structures differ from the rigid structure i.e. primary structure in that they are not intended to ensure the transmitting of loads generated by the engine which are to be transmitted towards the aircraft wing.

Amongst these secondary structures, there is usually a forward aerodynamic structure positioned at the front part of the rigid structure of the mounting pylon, this forward aerodynamic structure not only acting as aerodynamic cowling but also permitting the installation, separating and conveying of the different supply lines (air electric, hydraulic, fuel). Additionally, this forward aerodynamic structure generally carries the fan cowls of the associated engine, whilst the thrust reverser cowls are generally carried by the rigid structure of the mounting pylon.

In prior art solutions, the forward aerodynamic structure generally comprises a cradle clad with aerodynamic cowling, fixedly mounted on this cradle. The cradle aerodynamic cowling, also called aerodynamic cowl panel or element, therefore surrounds the cradle, the cradle acting as structural support for the fan cowls.

The above-mentioned cradle is usually mounted on the rigid structure using suitable mounting means. However, when the engine assembly is subjected to heavy stresses such as those encountered during take-off or landing phases or when flying in strong turbulence, and more simply under the effect of engine torque, engine thrust and thermal expansion, the securing of the cradle of the forward aerodynamic structure to the engine structure leads to a substantial modification in the overall geometry of the assembly, and more specifically the geometry of the nacelle. In particular, misalignment accompanying engine deformation may be observed between the air intake of the nacelle and the cradle aerodynamic cowling fixedly carried by the cradle which is joined to the rigid structure of the mounting pylon.

The phenomenon observed evidently causes drag, which is detrimental to the overall performance of the aircraft.

Also, it is indicated that a similar phenomenon is also encountered when the cradle fixedly carrying the aerodynamic cowling is no longer mounted on the rigid structure of the mounting pylon, but solely on the engine fan case joined to the air intake of the nacelle. In said case, misalignment may be observed between the cradle aerodynamic cowling joined to the fan case, and the other aerodynamic cowling of the mounting pylon, in particular the so-called fillet fairing.

OBJECT OF THE INVENTION

The objective of the invention is therefore to propose an aircraft engine assembly which overcomes the abovementioned disadvantages connected with the prior art.

For this purpose, the subject-matter of the invention is an aircraft engine assembly comprising an engine, an engine mounting structure and a nacelle surrounding the engine and provided with an air intake and fan cowls, the assembly comprising a cradle on which the fan cowls are movably mounted, this cradle being fixedly mounted on one of the elements from among the engine mounting structure and an entity comprising an engine fan case, and the air intake attached to this fan case. According to the invention, the engine assembly also has a junction aerodynamic fairing equipped with first mounting means mounted on the cradle, and also equipped with second mounting means mounted on the other of the elements chosen from among the engine mounting structure and said entity.

Therefore, with the proposed arrangement it is possible largely to limit the harmful effects of misalignment described above, since the particular securing of the junction aerodynamic fairing henceforth permits better response to engine deformation when strong demand is placed on the assembly. This advantageously allows drag losses to be limited which are encountered in prior art embodiments.

As an exemplary indication, if it is intended to mount the cradle fixedly onto the rigid structure of the mounting pylon, so that it forms part of a forward aerodynamic structure of this same pylon, the flush junction between the air intake of the nacelle and this same junction aerodynamic fairing can be maintained through the presence of the second mounting means connecting this junction aerodynamic fairing to the entity integrating the engine fan case and the nacelle air intake secured to it, whilst the flush junction between the junction aerodynamic fairing and the other aerodynamic cowling of the mounting pylon is evidently ensured by the presence of the first mounting means connecting this aerodynamic cowling to the cradle which itself is preferably fixedly joined to the rigid structure of the pylon.

Again by way of indication, when on the contrary it is intended to mount the cradle fixedly onto the fan case, the flush junction between the junction aerodynamic fairing and the other aerodynamic cowling of the mounting pylon can be maintained through the presence of the second mounting means connecting this aerodynamic junction fairing to the mounting pylon, whilst the flush junction between the junction aerodynamic junction fairing and the cradle aerodynamic cowling is evidently ensured by the presence of the first mounting means connecting this junction aerodynamic fairing to the cradle which itself is fixedly joined to the engine fan case.

In other words, it is indicated that the arrangement of the present invention, in all configurations, enables the junction aerodynamic fairing to act as <<carriage>> either between the air intake located upstream thereof and the cradle aerodynamic cowling when the cradle is secured to the rigid structure of the pylon, or between this same cradle aerodynamic cowling located upstream of the junction aerodynamic fairing and a fillet fairing of the mounting pylon when this cradle is secured to the fan case, this specificity also allowing a significant limitation of misalignment, synonymous with drag losses. As an indication, it is noted that it is the mere particular positioning mentioned above of the first and second mounting means which enable this <<carriage>> phenomenon to be obtained, irrespective of the design of these mounting means. Therefore, this obtained phenomenon is fully independent of the design of the attachments forming the first and second mounting means, the general idea behind the present invention effectively being to limit misalignments by providing aerodynamic cowling mounted firstly on the supporting cradle of the fan cowls by means of the first mounting means, and secondly mounted by means of the second mounting means on one of the elements from among the mounting structure of said entity, the other of these elements being fixedly mounted on this same supporting cradle of the fan cowls.

As is detailed below, two preferred embodiments are envisaged. For the case in which the supporting cradle of the fan cowls is fixedly mounted on the pylon, the order of the parts, from aft to forward, is the mounting pylon, the supporting cradle, the aerodynamic cowling and the entity comprising the air intake. In the other case, in which the cradle is fixedly joined to said entity, the order of the parts from aft to forward is the mounting pylon, the aerodynamic cowling, the supporting cradle and said entity.

Also, it is specified that the beneficial <<carriage>> phenomenon is all the more enhanced when the first and second mounting means equipping the junction aerodynamic fairing are respectively arranged in the vicinity of a forward end and an aft end of this same junction aerodynamic fairing, or the reverse.

According to a first preferred embodiment of the present invention, already mentioned above, the cradle is fixedly mounted onto a rigid structure of the engine mounting structure, and is preferably not fixed to said above-mentioned entity, the cradle then forming an integral part of a forward aerodynamic structure of the mounting structure. Also, the second mounting means equipping the junction aerodynamic fairing are mounted on the air intake.

In this case, preferably the junction aerodynamic fairing sets up an aerodynamic junction between the air intake and a cradle aerodynamic cowling surrounding this cradle. More particularly, provision is made so that the junction aerodynamic fairing is positioned between an aerodynamic protuberance of the air intake and the cradle aerodynamic cowling.

Nonetheless, it would evidently be possible to make provision for a configuration in which the junction aerodynamic fairing also integrates the cradle aerodynamic cowling to form a single aerodynamic cowling extending forwardly beyond the cradle, as far as the air intake, without departing from the scope of the invention. In other words, this single aerodynamic cowling would then extend towards the rear of the aerodynamic protuberance of the air intake, as far as the fillet fairing of the mounting pylon.

In this first embodiment, the second mounting means comprise an attachment designed to transmit the loads exerted in a longitudinal direction of the engine, in a transverse direction of this same engine, and also in a vertical direction of this engine.

According to a second preferred embodiment of the present invention, the cradle is fixedly mounted on the fan case, and preferably not fixed to the mounting structure. Additionally, the second mounting means equipping the junction aerodynamic fairing are mounted on a fairing of the mounting pylon, called fillet fairing.

In this second preferred embodiment, the junction aerodynamic fairing sets up an aerodynamic junction between said fairing of the mounting pylon and cradle aerodynamic cowling surrounding the cradle.

Nonetheless it would evidently be possible make provision for a configuration in which the junction aerodynamic fairing also integrates the cradle aerodynamic cowling, to form a single aerodynamic cowling extending aftward beyond the cradle, as far as the fillet fairing the pylon, without departing from the scope of the invention. In other words, this single aerodynamic cowling would in this case extend longitudinally from the aerodynamic protuberance of the air intake, as far as the fillet fairing of the mounting pylon.

In this second embodiment, the first mounting means comprise an attachment designed to transmit the loads exerted in a longitudinal direction of the engine, in a transverse direction of this same engine, and also in a vertical direction of this engine.

In this engine assembly, in which the nacelle conventionally comprises an air intake flush with the fan cowls, provisions is preferably made for the cradle to have a structural supporting role for the fan cowls, since the assembly also preferably comprises a plurality of fan cowl hinge fittings of which at least some are fixed to this same cradle.

Also, the engine mounting structure preferably comprises a plurality of engine attachments, including a forward engine attachment fixed firstly to the rigid structure and secondly to the engine fan case.

Finally, a further subject of the invention is an aircraft comprising at least one engine assembly such as the one described above, assembled to a wing or an aft portion of the fuselage of this aircraft.

Other advantages and characteristics of the invention will become apparent from the non-limiting detailed description given below.

BRIEF DESCRIPTION OF THE DRAWINGS

This description will be made with reference to the drawings amongst which.

DETAILED DESCRIPTION OF PREFERRED EMBODIMENTS

Figure 1:
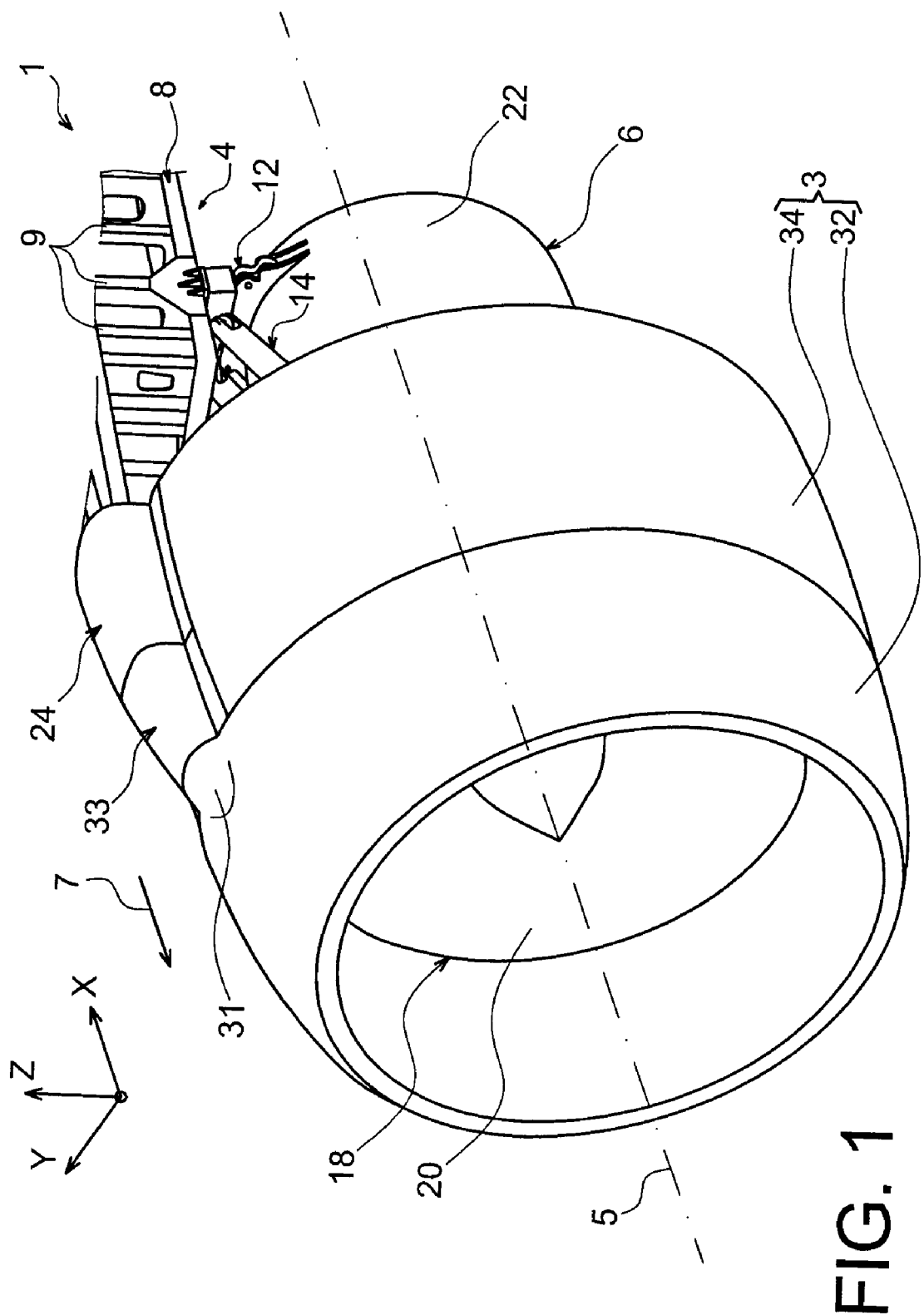
FIG. 1 is a partial, perspective view of an aircraft engine assembly, according to a first preferred embodiment of the present invention.
Figure 2:
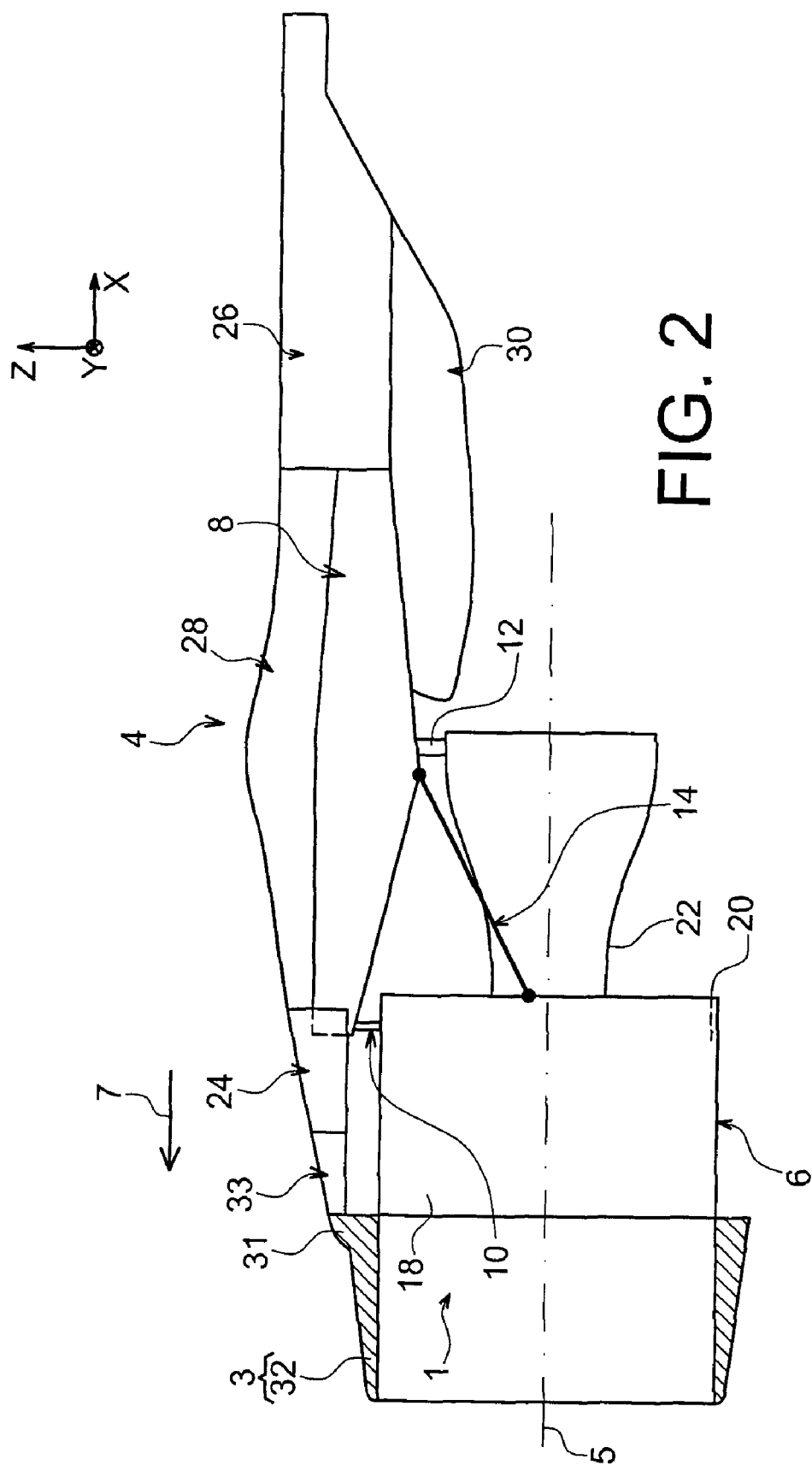
FIG. 2 is partial, side diagram of the engine assembly shown FIG. 1.

With reference first to FIGS. 1 and 2, an aircraft engine assembly 1 can be seen intended to be attached below a wing of this aircraft (not shown), this assembly 1 comprising an engine mounting structure 4, an engine 6 e.g. a turbojet engine hung from this mounting structure 4, and a nacelle 3 of which solely the front portion is shown in FIG. 1.

In the remainder of the following description, by convention X is used to designate the longitudinal direction of the mounting structure 4, which is comparable to the longitudinal direction of the turbojet engine 6, this direction X being parallel to a longitudinal axis 5 of this turbojet engine 6. Also Y is used to designate the direction oriented transversally relative to the mounting structure 4 and also comparable to the transverse direction of the turbojet engine 6, and Z designates the vertical direction or height, these three directions X, Y and Z lying orthogonal to each other.

Also, the terms <<forward>> and <<aft>> are to be considered relative to the direction of travel of the aircraft subsequent to the thrust exerted by the turbojet engine 6, this direction being schematically illustrated by the arrow 7.

Globally, the mounting structure 4 comprises a rigid structure 8, also called primary structure, carrying means to mount the engine 6, these mounting means having a plurality of engine attachments 10, 12, and a thrust load device 14 transmitting the thrust loads generated by the engine 6.

By way of indication, it is noted that the mounting structure 4 comprises another series of attachments (not shown) joined to the rigid structure 8 and allowing this assembly 1 to be mounted below the wing of the aircraft.

Additionally, the mounting structure 4 comprises a plurality of secondary structures joined to the rigid structure 8. These secondary structures ensure the separating and supporting of supply lines whilst carrying aerodynamic fairing elements which are described below.

It is indicated that the turbojet engine 6 forwardly has a large-size fan case 18 delimiting an annular fan duct 20, and towards the aft comprises a central casing 22 of smaller size enclosing the core of this turbojet engine. The cases 18 and 22 are evidently secured to each other and have a junction usually called an intermediate casing. Finally, it is specified that the central casing 22 is extended aftwards via a so-called exhaust case (not referenced).

As can be clearly seen FIG. 1, the engine attachments 10, 12 of the mounting structure 4 are designed to be two in number, and are respectively called the forward engine attachment and aft engine attachment. The forward engine attachment 10 is preferably inserted between a forward portion of the rigid structure 8 and an upper portion of the fan case 18, also called the radial end part. This forward engine attachment 10 is of conventional design known to persons skilled in the art, and designed for example to transmit the loads exerted in the three directions X, Y and Z.

Also, the aft engine attachment 12 also of conventional design known to those skilled in the art, and possibly being designed to transmit the loads exerted in directions Y and Z, is inserted between a more aft portion of the rigid structure 8 and the central casing 22 or exhaust case.

The thrust load device 14 transmitting thrust loads generated by the engine can be in the conventional form of two thrust links each arranged either side of the engine 6, the forward end of each thrust link being mounted on an aft part of the fan case or intermediate casing, and the aft end being joined to the aft engine attachment 12 or to the rigid structure 8 in the vicinity thereof.

In this preferred embodiment of the present invention, the rigid structure 8 is in the form of a box extending from forward to aft substantially in direction X.

The box 8 that is best illustrated FIG. 1 is then in the form of a pylon of similar design to the usual design for mounting pylons of turbojet engines, in particular in that it is provided with transverse ribs 9 each having the shape of a rectangle oriented along plane YZ.

With more specific reference to FIG. 2, the secondary structures of the pylon 4 include a forward aerodynamic structure 24, an aft aerodynamic structure 26, fillet fairing 28 for the forward and aft aerodynamic structures, and a lower aft pylon fairing 30.

Globally, these secondary structures are conventional elements identical or similar to those found in the prior art, and known to persons skilled in the art. More precisely, the forward aerodynamic structure 24 which is the only one shown FIG. 1 for reasons of clarity is usually positioned at the front of the wing and slightly raised relative to the primary structure 8 to which it is attached. It has an aerodynamic profile function between an upper part of the fan cowls hinged thereupon and the leading edge of the wing. This forward aerodynamic structure 24 then not only has a supporting function for the fan cowls and the aerodynamic fairing, but also allows the installation, separating and conveying of supply lines (air, electric, hydraulic, fuel).

In the direct aft extension of this structure 24, mounted above the rigid structure 8, is the fillet fairing 28 also called <<karman>> fairing. Next, still towards the aft, the fillet fairing 28 is extended by the aft aerodynamic structure 26 which contains most of the hydraulic equipment. This structure 26 is preferably fully positioned towards the aft relative to the rigid structure 8 and is therefore attached below the wing of the aircraft.

Finally, below the rigid structure 8 and the aft aerodynamic structure 26 there is the lower aft pylon fairing 30. Its essential functions are the forming of a fire shield and the formation of aerodynamic continuity between the engine exhaust and the mounting pylon.

Still with reference to FIGS. 1 et 2, part of the nacelle 3 can be seen which at its forward end comprises an air intake 32 attached to the front of the fan case 18, this air intake 32 being directly followed towards the aft by two fan cowls 34 (only one being visible since this is a perspective view) each movably mounted on the secondary aerodynamic structure 24 discussed above. Although not shown, it is to be appreciated that the nacelle 3 of conventional design aftwardly comprises other elements known to those skilled in the art, such as the thrust reverser cowls mounted on the rigid structure 8.

Also, the air intake 32 at its upper aft portion comprises an aerodynamic protuberance 31 lying in the forward continuity of the forward aerodynamic structure 24 of the pylon. More precisely, and as can be seen in the figures, one of the particular aspects of the present invention lies in the presence of a junction aerodynamic fairing 33 between the protuberance 31 and the forward aerodynamic structure 24 as will be detailed below. Evidently, it is sought to obtain the best possible aerodynamic continuity between the above-mentioned junction elements 31, 33 and 24 which extend substantially in direction X at an upper portion of the engine assembly 1. As can be seen FIG. 1, the flush elements 33, 24 extend together over a longitudinal distance corresponding to the distance of the fan cowls 34 above which they lie.

Figure 3:
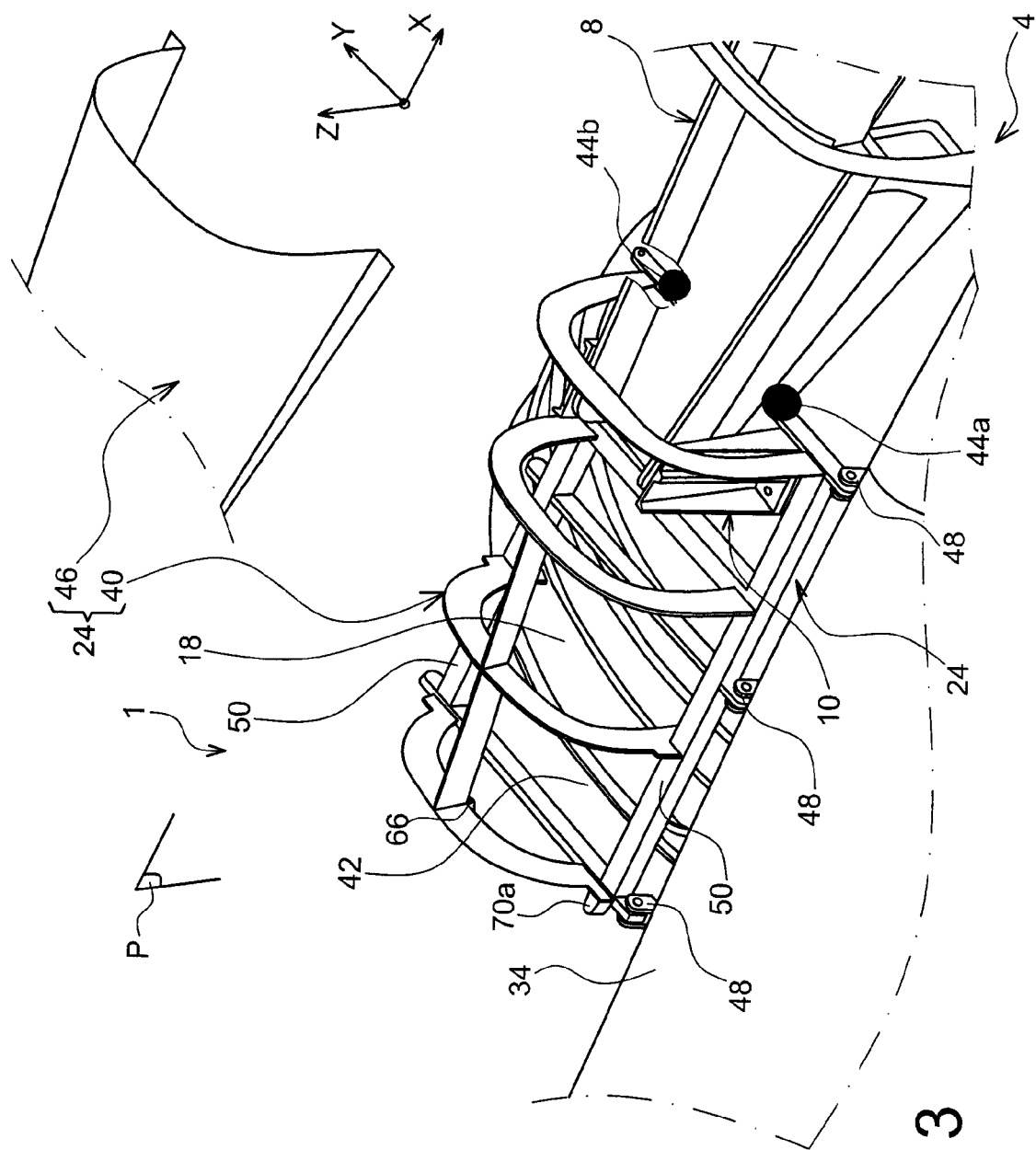
FIG. 3 gives a partial, perspective, detailed view of the engine assembly shown FIG. 1, more specifically showing the supporting cradle for the nacelle fan cowls.

Reference will now be made to FIG. 3 detailing in particular the forward aerodynamic structure 24.

The forward aerodynamic structure 24 has a cradle 40 forming the structural portion of this element. It globally extends above the fan case 18 and is of conventional design known to those skilled in the art, namely by the assembly of spars extending substantially in direction X and of transverse, downward-facing arches of substantially semi-cylindrical shape for example, as can be clearly seen FIG. 3. In this same figure, it can also be seen that the forward part of the rigid structure 8 of the mounting pylon 4 enters inside this cradle by passing through at least the first arch of this same cradle. Also, since the above-mentioned forward engine attachment 10 is mounted at a forward end of the rigid structure 8, this implies that this forward attachment 10 is partly located within an inner space delimited by the arches of the cradle.

To ensure mounting of the cradle 40 on the rigid structure 8 from which it can be forwardly cantilevered, aft mounting means are provided preferably in the form of two aft semi-attachments arranged either side of a forward portion of the rigid structure 8. As can be seen FIG. 3, these two semi-attachments 44a, 44b schematically illustrated are preferably positioned aft relative to the forward engine attachment 10. Also, these two semi-attachments are arranged symmetrically via a median vertical plane P passing through the longitudinal axis 5 of the engine, this plane P globally forming a plane of symmetry for the engine assembly intended to be attached below the wing of the aircraft. By way of indication, provision is made so that the cradle 40 is solely attached to the pylon 4 and therefore not on the entity which is separate therefrom and comprising the fan case 18 and air intake 32 fixedly joined this fan case.

The cradle 40, conventionally clad with aerodynamic cowling 46 that is preferably solely attached to this same cradle 40 and not onto any other element of the assembly, is provided with a plurality of fan cowl 34 hinge fittings, these hinge fittings preferably being arranged on each of the two side spars of the cradle, arranged either side of plane P. Each of these two spars 50 therefore carries a plurality of hinge fittings 48 joined to one of the nacelle fan cowls 34, these hinge fittings 48 carried by each spar 50 alternatively possibly forming all or part of the mounting means of a given fan cowl. In the example shown FIG. 3, the hinge fittings 48 provided on a given spar 50, for example designed to be three in number, are associated with a fourth hinge fitting (not shown) positioned in the forward continuation of the three others. Evidently, for each of the two fan cowls 34, the hinge fittings 48 provided on the cradle 40 and the hinge fitting(s) 48 positioned forwardly, are designed to be arranged along one same hinge axis of the cowl 34.

Figure 4:
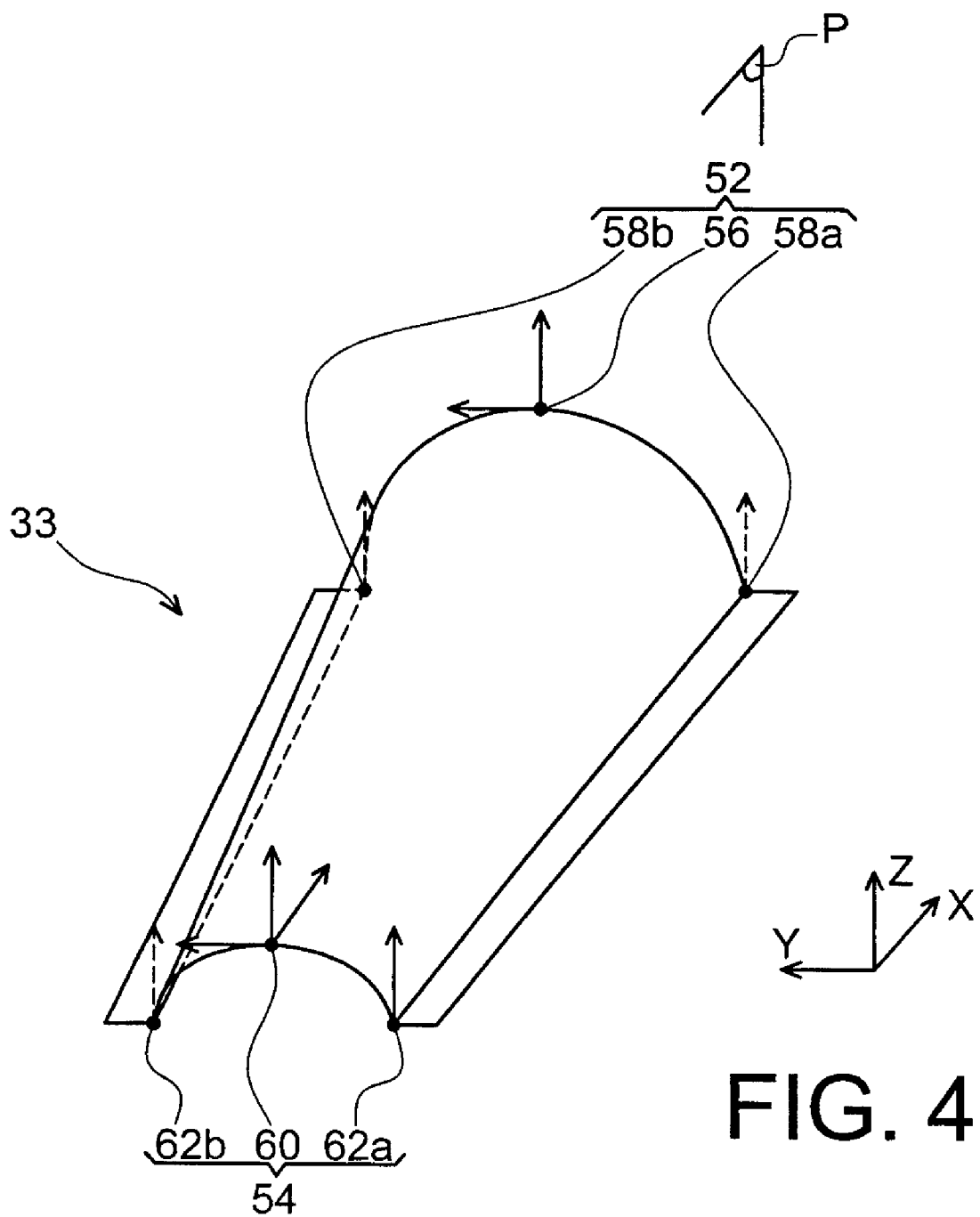
FIG. 4 is a schematic, perspective view of the junction aerodynamic fairing equipped with its mounting means on the engine assembly.

With reference now to FIG. 4, the junction aerodynamic fairing 33 can be seen that is intended to be joined at its aft end to the cradle 40, and at its forward end to the air intake 32, and more precisely to the protuberance 31 thereof.

For this purpose the fairing 33 is equipped with first mounting means 52 or aft mounting means intended to cooperate with a forward end of the cradle 40, and with second mounting means 54 or forward mounting means intended to cooperate with the air intake 32.

More precisely, the first mounting means 52 essentially comprise an attachment 56 designed to transmit the loads exerted in directions Y and Z, but not those exerted in direction X, as is schematized by the arrows in FIG. 4. It is arranged at an upper median portion of the aft end of the fairing 33, and is therefore crossed by above-mentioned plane P. Also, the means 52 may also comprise two additional so-called <<adjustable>>, semi-attachments 58a, 58b, each being solely capable of transmitting the loads exerted in direction Z. Also, these two semi-attachments 58a, 58b are arranged symmetrically relative to a median vertical plane P passing through the longitudinal axis 5 of the engine, respectively at the two side ends of the aft end of the fairing 33.

Also, the second mounting means 54 essentially comprise an attachment 60 designed to transmit the loads exerted in directions X, Y and Z, as is schematized by the arrows in FIG. 4. It is arranged at an upper median portion of the forward end of the fairing 33, and is therefore crossed by the above-mentioned plane P. Also, the means 54 may also comprise two additional semi-attachments 62a, 62b of which one is fixed and the other is so-called <<adjustable>>, each one also solely being capable of transmitting loads exerted in Z. Also, these two semi-attachments 62a, 62b are symmetrically arranged relative to the median vertical plane P passing through the longitudinal axis 5 of the engine, respectively at the two side ends of the forward end of the fairing 33.

Therefore the means 52, 54 offer four vertical attachments 58a, 58b, 62a, 62b of which three are adjustable, to provide easy mounting of the fairing 33 onto the engine assembly 1.

Figure 5:
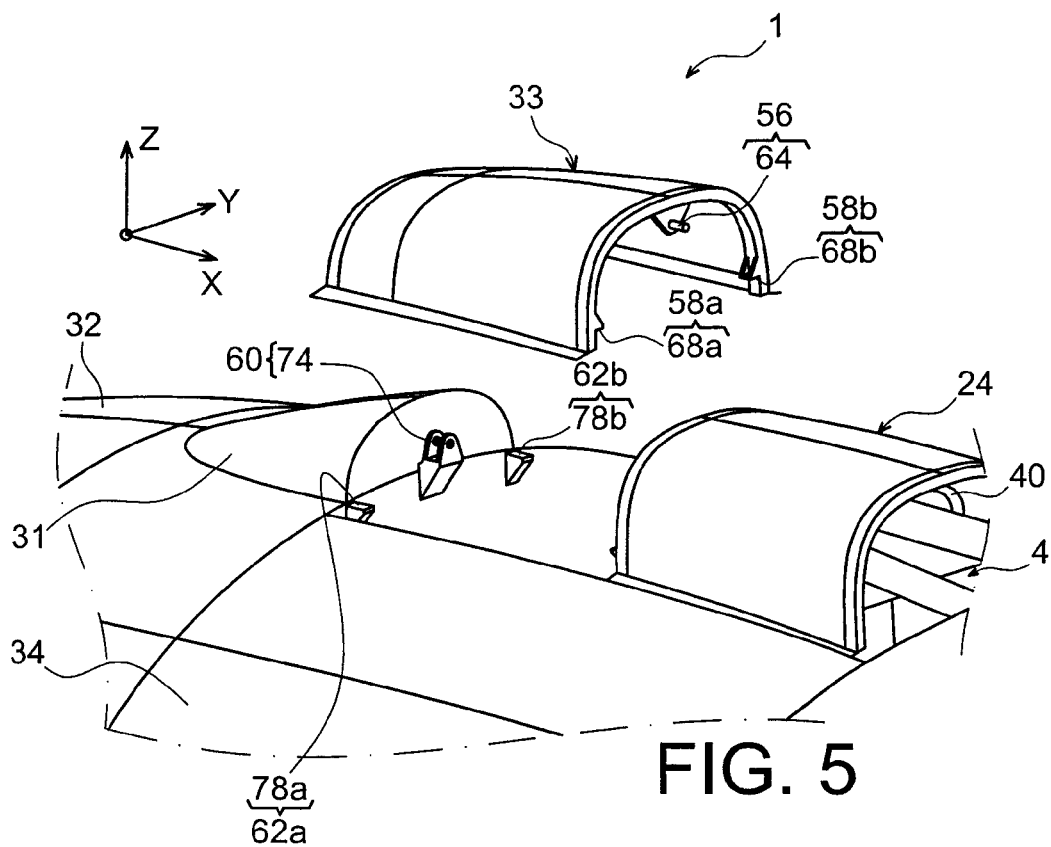
FIGS. 5 and 6 are partly exploded, detailed perspective views from two different angles, of a portion of the engine assembly shown FIG. 1.
Figure 6:
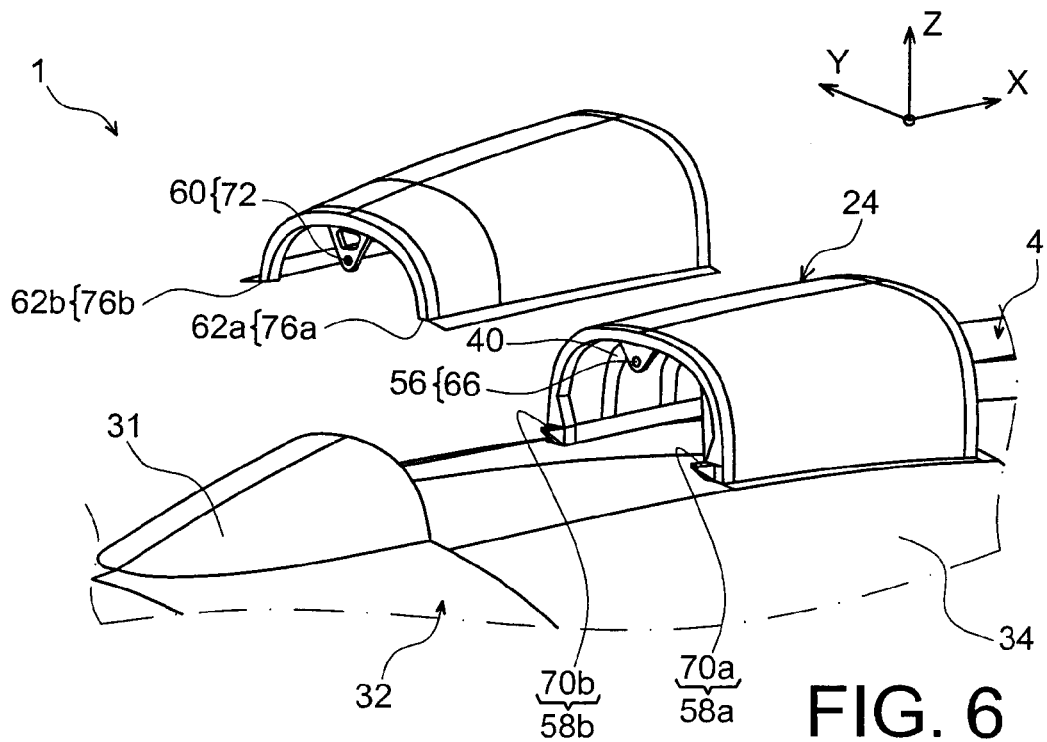

FIGS. 5 and 6 illustrate an exemplary embodiment of the different above-mentioned attachments. For example, it can be seen that attachment 56 can be in the shape of a pin 64 extending in direction X towards the aft from the aft end of the fairing 33 and passing through a bracket 66 carried by the most forward lying arch of the cradle 40. The two semi-attachments 58a, 58b are obtained by providing vertical abutments 68a, 68b facing downwardly on the aft end of the fairing 33, and vertical abutments 70a, 70b facing upwardly on the two ends of the most forward lying arch of the cradle 40, respectively positioned facing the abutments 68a, 68b. Evidently assembly means of bolt type are provided to secure the abutments two by two.

Also, it can be seen that the attachment 60 can be in the form of a bracket 72 extending downwardly along a plane XZ from the forward end of the fairing 33, and being housed between two heads of a clevis 74 carried by the aft end of the air intake 32, in close vicinity with its protuberance 31. A connecting pin (not shown) is intended to pass through the two heads of the clevis 74 and the bracket 72, extending in direction X.

The two semi-attachments 62a, 62b are obtained by providing vertical abutments 76a, 76b oriented downwardly on the forward end of the fairing 33, and vertical abutments 78a, 78b oriented upwardly on the aft end of the air intake 32, and more precisely at the base of its protuberance 31. Evidently, these vertical abutments 78a, 78b are respectively positioned facing abutments 76a, 76b, and assembly means of bolt type are provided to secure these abutments two by two.

The above-described attachments therefore allow the junction aerodynamic fairing 33 to act as <<carriage>> between the aerodynamic protuberance 31 of the air intake 32 and the cradle aerodynamic cowling 46, and therefore avoid the onset of too much misalignment between these parts. By way of indication, this fairing 33 only has an aerodynamic function, which means that it can be made from panels or similar known to persons skilled in the art for this type of application. Nonetheless, it may also be equipped with reinforcements for the mere purpose of providing support for the above-mentioned attachments. In said case, in which the fairing 33 integrates reinforcements whose role is not to ensure a structural function such as that met by the adjacent cradle 40 carrying the fan cowls 34, the panels and these reinforcements can then optionally be manufactured in a single piece.

Figure 7:
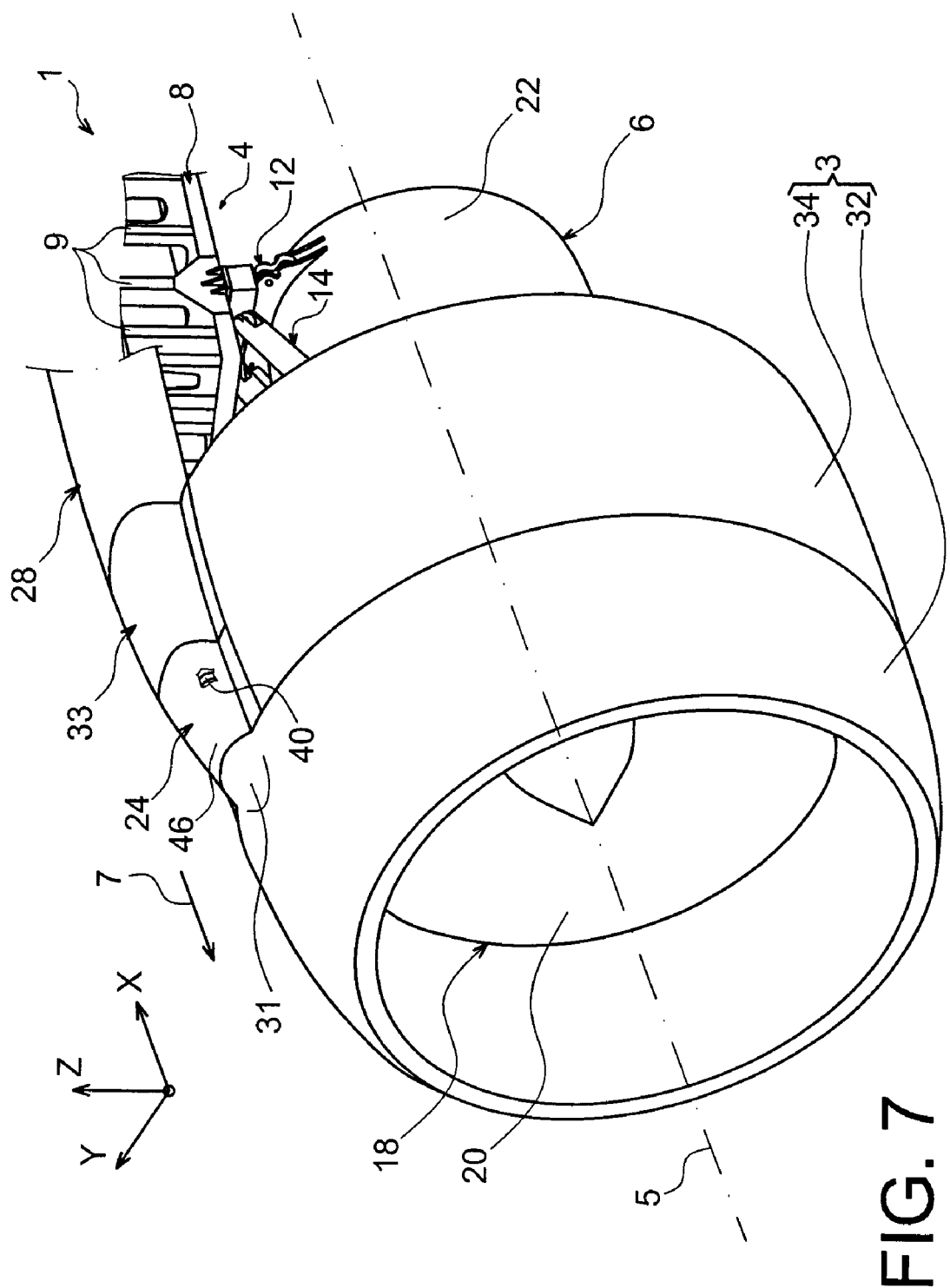
FIG. 7 gives a similar view to that shown FIG. 1, the engine assembly being illustrated in the second preferred embodiment of the present invention.

With reference now to FIG. 7, part of an engine assembly can be seen according to a second embodiment of the present invention. This embodiment differs from the first essentially in that the cradle supporting the fan cowls is no longer fixedly mounted on the mounting pylon, but on said above-mentioned entity and more particularly on the fan case.

In this case, preferably provision is no longer made on the mounting pylon for a forward aerodynamic structure carrying the fan cowls, this structure or a similar aerodynamic structure then being arranged in the aft extension of the protuberance 31 of the air intake 32 as can be seen FIG. 1 under the same reference number 24.

Globally, this structure 24 effectively comprises a cradle 40 fixedly joined to the fan case, and cradle aerodynamic cowling 46 surrounding the same and lying in the aft aerodynamic continuity of the protuberance 31.

One of the particular aspects of this second preferred embodiment lies in the presence of a junction aerodynamic fairing 33 between the aerodynamic structure 24 and the mounting pylon 4, and more precisely its fillet fairing 28. Evidently, it is sought to obtain the best possible aerodynamic continuity between the above-mentioned junction elements 24, 33, 28, which substantially extend in direction X at an upper portion of the engine assembly 1. As can be seen FIG. 7, the flush elements 24, 33 extend together over a longitudinal distance corresponding to that of the fan cowls 34 above which they are positioned.

Similar to the flush junction between the cradle cowling 46 and the fillet fairing 28 in the first embodiment, the flush junction in this second embodiment between the protuberance 31 and the cowling 46 does not entail any constraint since these two elements are secured to the engine fan case.

The junction aerodynamic fairing 33 is preferably of the same design as the one set forth above with reference to FIG. 4. Additionally, it can be equipped with similar mounting means, the aft means 52 then forming the second mounting means intended to be connected to the fairing 28, and the forward means 54 forming the first mounting means intended to be connected to the cradle 40.

Figure 8:
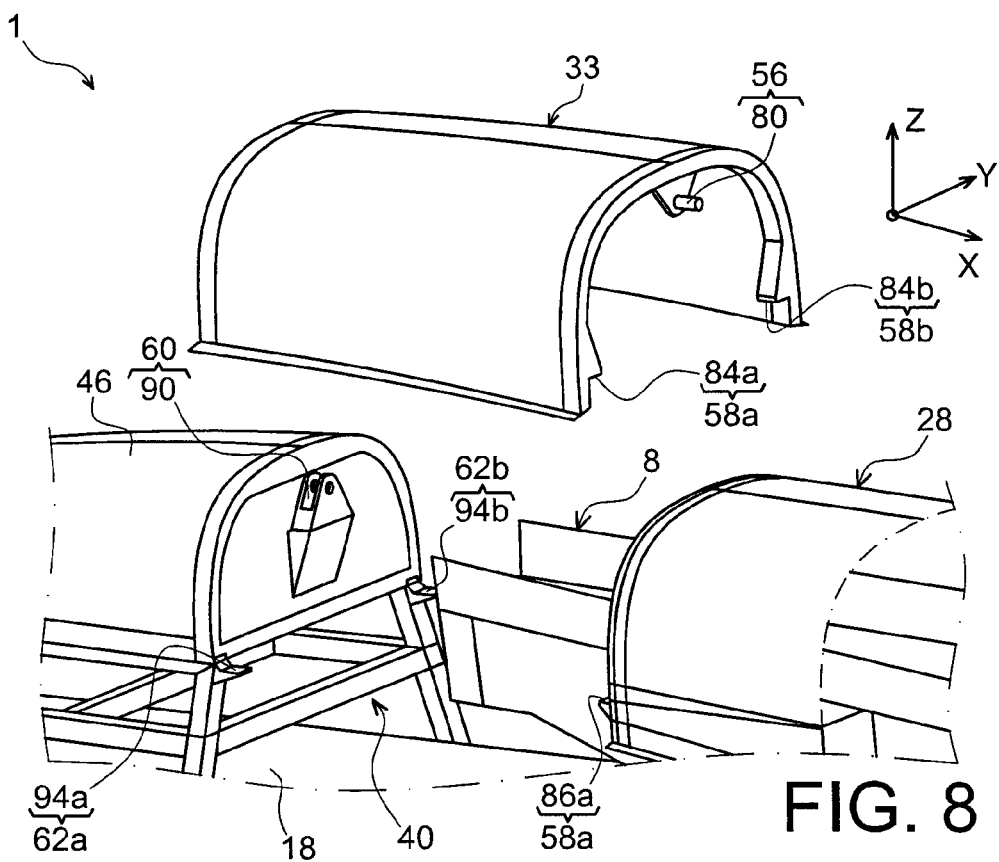
FIGS. 8 and 9 are partly exploded, detailed perspective views taken from two different angles of a portion of the engine assembly shown FIG. 7.
Figure 9:
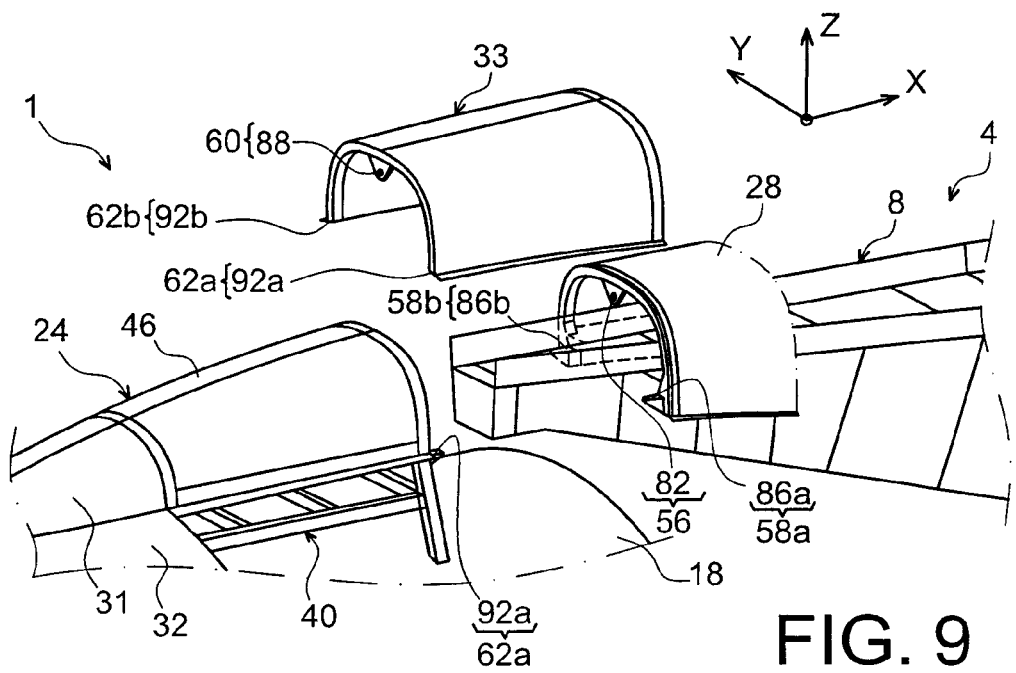

FIGS. 8 and 9 illustrate an exemplary embodiment for the different attachments which form the mounting means 52, 54. Therefore, it can be seen that the attachment 56 can be in the form of a pin 80 extending towards the aft in direction X from the aft end of the fairing 33, and passing through a bracket 82 carried by the most forward lying arch of the fillet fairing 28. The two semi-attachments 58a, 58b are obtained by providing vertical abutments 84a, 84b facing downwardly on the aft end of the fairing 33, and vertical abutments 86a, 86b facing upwardly on the two ends of the most forward lying arch of the fillet fairing 28, respectively positioned facing abutments 84a, 84b. Evidently, assembly means of bolt type are provided to secure the abutments two by two.

Also, it can be seen that the attachment 60 can assume the form of a bracket 88 extending downwardly along a plane XZ from the forward end of the fairing 33, and being housed between the two heads of a clevis 90 carried by the aft end of the aerodynamic structure 24 integrating the cradle 40. A connecting pin (not shown) is intended to pass through the two heads of the clevis 90 and through the bracket 88, extending in direction X.

The two semi-attachments 62a, 62b are obtained by providing vertical abutments 92a, 92b oriented downwardly on the forward end of fairing 33, and vertical abutments 94a, 94b oriented upwardly on the aft end of the aerodynamic structure 24 integrating the cradle 40. Evidently, these vertical abutments 94a, 94b are respectively positioned facing abutments 92a, 92b, and assembly means of bolt type are provided to secure these same abutments two by two.

The above-described attachments therefore enable the junction aerodynamic fairing 33 to act as <<carriage>> between the cradle aerodynamic cowling 46 and the forward portion of the fillet fairing 28, and thereby avoid the onset of too much misalignment between these elements.

Evidently, various modifications can be made by persons skilled in the art to the invention just described solely as a non-limiting example. In this respect, it can notably be indicated that while the engine assembly 1 has been described in a configuration adapted for underwing mounting, this assembly 1 could also have a different configuration allowing it to be mounted above this same wing or on an aft portion of the fuselage of this aircraft.

The invention claimed is:

1. An aircraft engine assembly comprising:
an engine;
an engine mounting structure;
a nacelle surrounding the engine and comprising an air intake and fan cowls;
a cradle on which the fan cowls are movably mounted, the cradle being fixedly mounted on one of the engine mounting structure and a fan assembly comprising a fan case for the engine and the air intake attached to the fan case;
a cradle aerodynamic cowling housing said cradle, and
a junction aerodynamic fairing extending longitudinally with said cradle aerodynamic cowling along a longitudinal axis X of the engine mounting structure, said junction aerodynamic fairing comprising first mounting means mounted on the cradle and second mounting means mounted on the other of the engine mounting structure and the fan assembly.

2. An engine assembly according to claim 1, wherein the first and second mounting means comprising of the junction aerodynamic fairing are respectively arranged in a vicinity of a forward end and an aft end of the junction aerodynamic fairing, or conversely.

3. An engine assembly according to claim 1, wherein the cradle is fixedly mounted on a rigid structure of the engine mounting structure, the cradle forming an integral part of a forward aerodynamic structure of the mounting structure, and wherein the second mounting means of the junction aerodynamic fairing is mounted on the air intake.

4. An engine assembly according to claim 3, wherein the junction aerodynamic fairing provides an aerodynamic junction between the air intake and said cradle aerodynamic cowling.

5. An engine assembly according to claim 4, wherein the junction aerodynamic fairing is positioned between the air intake and the cradle aerodynamic cowling.

6. An engine assembly according to claim 3, wherein the second mounting means comprises an attachment configured to transmit loads exerted in a longitudinal direction of the engine, in a transverse direction of the engine, and in a vertical direction of the engine.

7. An engine assembly according to claim 1, wherein the cradle is fixedly mounted on the fan case, and wherein the second mounting means or the aerodynamic junction fairing is mounted on a fillet fairing of the engine mounting structure.

8. An engine assembly according to claim 7, wherein the junction aerodynamic fairing provides an aerodynamic junction between the fairing and said cradle aerodynamic cowling.

9. An engine assembly according to claim 7, wherein the first mounting means comprises an attachment configured to transmit loads exerted in a longitudinal direction of the engine, in a transverse direction of the engine, and in a vertical direction of the engine.

10. An aircraft comprising at least one engine assembly according to claim 2, assembled on a wing or an aft portion of the fuselage of the aircraft.

\* \* \* \* \*